United States Patent
Kwisthout et al.

(10) Patent No.: US 8,228,353 B2
(45) Date of Patent: Jul. 24, 2012

(54) SYSTEM, METHOD AND COMPUTER-READABLE MEDIUM FOR DISPLAYING LIGHT RADIATION

(75) Inventors: Cornelis Wilhelmus Kwisthout, Eindhoven (NL); Guido Galeazzi, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 446 days.

(21) Appl. No.: 12/519,528

(22) PCT Filed: Dec. 14, 2007

(86) PCT No.: PCT/IB2007/055107
§ 371 (c)(1),
(2), (4) Date: Jun. 17, 2009

(87) PCT Pub. No.: WO2008/078233
PCT Pub. Date: Jul. 3, 2008

(65) Prior Publication Data
US 2010/0026734 A1 Feb. 4, 2010

(30) Foreign Application Priority Data
Dec. 20, 2006 (EP) ..................................... 06126694

(51) Int. Cl.
*G09G 5/10* (2006.01)
(52) U.S. Cl. .......... 345/690; 345/102; 345/77; 362/97.2
(58) Field of Classification Search ............... 345/87, 345/89, 101–102, 204, 890, 691, 77; 359/51, 359/61
See application file for complete search history.

(56) References Cited

U.S. PATENT DOCUMENTS

| | | | |
|---|---|---|---|
| 6,414,664 B1 * | 7/2002 | Conover et al. | 345/89 |
| 6,795,053 B1 * | 9/2004 | Funamoto et al. | 345/102 |
| 7,136,044 B2 * | 11/2006 | Sasaki | 345/102 |
| 2005/0104838 A1 | 5/2005 | Sasaki | |

FOREIGN PATENT DOCUMENTS

| | | |
|---|---|---|
| EP | 04090161 A2 | 1/1991 |
| EP | 1551178 A1 | 7/2005 |
| WO | 9904562 A1 | 1/1999 |
| WO | 0199475 A | 12/2001 |
| WO | 2005062608 A2 | 7/2005 |
| WO | 2007107930 A1 | 9/2007 |

OTHER PUBLICATIONS

Stauder, J.: "Augmented Reality With Automatic Illumination Control Incorporating Ellipsoidal Models"; IEEE Transactions on Multimedia, vol. 1, No. 2, Jun. 1999, pp. 136-143.

* cited by examiner

*Primary Examiner* — Lun-Yi Lao
*Assistant Examiner* — Shaheda Abdin
(74) *Attorney, Agent, or Firm* — Shimokaji & Assoc., PC

(57) ABSTRACT

A system suitable for backlighting is provided. The system comprises a monitor unit configured to monitor an information signal, and to generate a first signal based at least partly on the information comprised in the information signal, a control unit configured to control the reaction time of at least one illumination area capable of emitting properties of light and comprised in the system, based on the first signal, wherein the first signal may comprise scene change information. The system provides for a more peaceful backlighting effect while still being able to stress actions, such as scene changes, happening in the presented information signal. A method and computer-readable medium are also provided.

12 Claims, 3 Drawing Sheets

SYSTEM, METHOD AND COMPUTER-READABLE MEDIUM FOR DISPLAYING LIGHT RADIATION

FIELD OF THE INVENTION

This invention pertains in general to a visual display system suitable for including with or adding to display devices, such as television sets. Moreover, the invention relates to a method and computer-readable medium for operating such a visual display system.

BACKGROUND OF THE INVENTION

Visual display devices are well known and include cinematic film projectors, television sets, monitors, plasma displays, liquid crystal display LCD televisions, monitors, and projectors etc. Such devices are often employed to present images or image sequences to viewer.

The field of backlighting began in the 1960s due to the fact that televisions require a "darker" room for optimal viewing. Backlighting is in its simplest form white light, emitted from e.g. a light bulb, projected on a surface behind the visual display device. Backlighting has been suggested to be used to relax the iris and reduce eyestrain.

During recent years the backlighting technology has become more sophisticated and there are several display devices on the market with integrated backlighting features that enables emitting colors with different brightness depending on the visual information presented on the display device.

The benefits of backlighting in general includes: a deeper and more immersive viewing experience, improved color, contrast and detail for best picture quality, and reduced eye strain for more relaxed viewing. Different advantages of backlighting require different settings of the backlighting system. Reduced eye strain may require slow changing colors and a more or less fixed brightness while more immersive viewing experience may require an extension of the screen content i.e. the same brightness changes with the same speed as the screen content.

EP 1551 178 A1 discloses a supplementary visual display system for use in conjunction with a display device including an image display region for presenting images to a viewer. The display system comprises one or more illumination sources that at least partially peripherally surround the image display region. A drawback of the system of the publication is that it does not enable both relaxed and immersive viewing experience simultaneously.

Backlighting television sets generally include several templates, such as Relaxed, Moderate, and Dynamic templates with predefined settings. Choosing a Relaxed mode gives a slowly responding backlighting effect and thus provides a relaxed backlighting background while watching the content. A disadvantage of the templates, especially the Relaxed mode, is that the setting is fixed over time. Accordingly, in case of the Relaxed mode, the backlighting effect changes very slowly, but this is also the case when there is a sudden action, such as a scene change, in the image content. Slowly changing backlighting within a scene is not a problem since there is a correlation between the color fading out and the current color. However, the problem becomes apparent when both the color and brightness, e.g. going from a very bright to a very dark scene, differences of two subsequent scenes are great. In current backlighting implementations a previous bright scene may overwhelm the new scene for seconds.

Hence, an improved visual display system, method, apparatus and computer readable medium would be advantageous.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a system, method and computer-readable medium according to the appended patent claims.

According to one aspect of the invention, a system is provided. The system comprises a monitor unit configured to monitor an information signal, and to generate a first signal based at least partly on the information comprised in the information signal, a control unit configured to control the reaction time of at least one illumination area capable of emitting properties of light and comprised in the system, based on the first signal.

According to another aspect of the invention, a method is provided. The method comprises monitoring an information signal, generating a first signal based at least partly on the information comprised in the information signal, and controlling the reaction time of at least one illumination area capable of emitting properties of light, based on the first signal.

According to yet another aspect of the invention, a computer-readable medium having embodied thereon a computer program for processing by a processor is provided. The computer program comprises a monitor code segment for monitoring an information signal, a generation code segment for generating a first signal based at least partly on the information comprised in the information signal, and a control code segment for controlling the reaction time of at least one illumination area capable of emitting properties of light, based on the first signal.

An object of some embodiments of the present invention is to combine two conflicting features in backlighting sensation. One extreme is to make the whole viewing experience more relaxing by making the background of the TV smoothly adapting itself to the presented image content. The other extreme is to make an effect on the wall that in the corners of our eyes look like a natural continuation of the picture. With other words, the TV looks bigger than it actually is and the user has the same sensation as in a cinema where there are also things happening in the corners of the eyes. This requires that the backlighting action follows the screen content sufficiently fast.

Embodiments of the present invention combines both extremes to provide both sensations to the user simultaneously using a parameter referred to as the reaction time, also called integration time, rise/fall time etc. This parameter defines how long a color that is not anymore present in at least a part of the presented image content should still remain in the current backlighting effect and how fast a new color should be dominant in the backlighting effect.

The present invention provides according to some embodiments a display system, method, and computer-readable medium to control the reaction time of an illumination area capable of emitting light radiation based on the output of a video processing algorithm detecting scene changes in an image sequence and/or video signal.

Embodiments of the present invention solve the problem that people want to have a more immersive viewing experience, the idea that they are looking at a much bigger screen, but they also do not want to have to restless effects in the corners of their eyes except from when an action, such as a scene change, occurs in the presented image content. Up until now both requirements are conflicting in choosing the right backlighting effect.

An advantage of embodiments of the present invention is that the display system may be implemented in a very easy way, using existing parameters.

Another advantage is that the present invention gives a user the opportunity to set the backlighting system to a relaxed mode while still having a high correlation between the backlighting system and the current scene.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

The following description focuses on embodiments of the present invention applicable to backlighting of visual display devices, such as cinematic film projectors, television sets, monitors, plasma displays, liquid crystal display LCD televisions, projectors etc. However, it will be appreciated that the invention is not limited to this application but may be applied to many other areas in which backlighting is desired.

The present invention provides a solution of smoothing the backlighting effect in order to make the backlight a peaceful continuation of the screen while still being able to stress or support actions, such as scene changes happening on the display system screen. The solution is according to some embodiments making the reaction time of the illumination area capable of emitting backlight, sensitive to scene changes in the presented image content. This means that the reaction speed for an illumination area will not be fixed over time but may be varied based on the presented image content. An advantage of this feature is e.g. that a slowly reacting relaxed backlighting mode, wherein colors and brightness are slowly changing in dependence of the presented image content, will still respond quickly to a new scene in the content. This prevents the illumination areas to emit color and brightness corresponding to prior scene. In practice this means that the backlighting effect adapts immediately to a new scene in the presented image content and then automatically adapt to the original reaction time used prior to the scene change within the new current scene.

Figure 1:
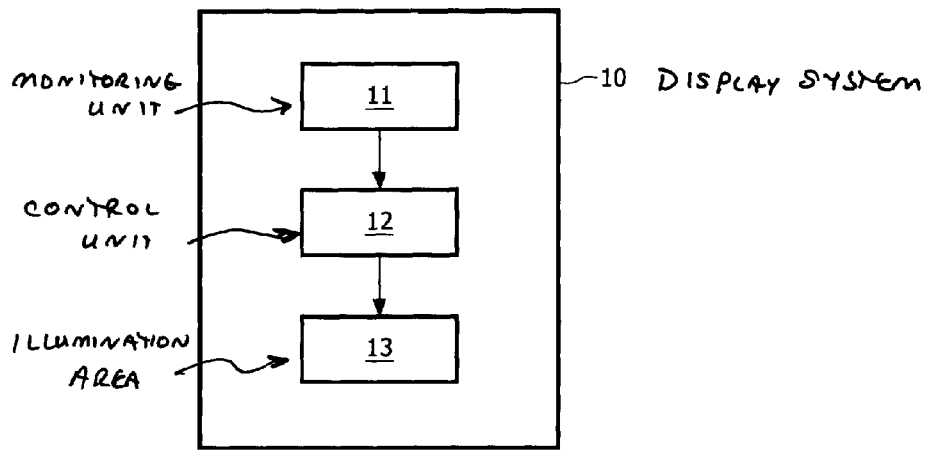
FIG. 1 is a block diagram of a system according to an embodiment.

In an embodiment, a display system 10, according to FIG. 1, is provided. The system may be used in conjunction with a display device comprising a display region capable of presenting an image or image sequence to a viewer. The system comprises at least one illumination area 13 capable of emitting properties of light radiation, a monitor unit 111 for monitoring an information signal, and to generate a first signal based at least partly on the information comprised in the information signal, and a control unit 12 for controlling the reaction time of each illumination area based on the first signal.

Illumination Area

In an embodiment the illumination area comprises at least one source of illumination and one input for receiving a signal, e.g. from the monitor unit, that controls properties of light radiation such as brightness and/or color of the illumination source.

The illumination source may e.g. be a light emitting diode, LED, for emitting light based on the image content on the display device. The LED is a semiconductor device that emits incoherent narrow-spectrum light when electrically biased in the forward direction. The color of the emitted light depends on the composition and condition of the semiconducting material used, and may be near-ultraviolet, visible or infrared. By combination of several LEDs, and by varying the input current to each LED, a light spectrum ranging from near-ultraviolet to infrared wavelengths may be presented.

The present invention is not limited to the kind of illumination source being used to create the backlighting effect. Any source capable of emitting light may be used.

In an embodiment the display device and the illumination area may be comprised in a projector that in use projects an image on an area on a surface, such as a wall. The projected image comprises a display region capable of presenting an image or image sequence to a viewer. The display region may be centered in the projected image while around it the remaining part of the projection area is utilized by a backlighting effect, comprising at least two illumination areas having different reaction speed depending on their position within the projected image. In this embodiment the outer areas may still be generated differently from the areas closer to the projected display region.

In an embodiment the illumination area comprises three LEDs of the colors red, green and blue. By varying the input current to each LED a light spectrum of visible colors corresponding to the RGB standard may be presented.

In an embodiment display device and illumination area may be comprised in a LED video screen, such as a vidiwall. The LED video screen comprises a display region capable of presenting an image or image sequence to a viewer. The display region may be centered in the LED video screen while around it the remaining part of the LED video screen area is configured to provide a backlighting effect, comprising at least one illumination area.

Illumination sources other than LEDs are equally possible within the scope of the invention. Hence, the use of the term LED in this context should be appreciated as a light emitting system that is capable of receiving an electric signal and producing a color of light in response to the signal, e.g. light emitting polymers, semiconductor dies that produce light in response to current, organic LEDs, electro-luminescent strips, silicon based structures that emit light, and other such systems.

In an embodiment the illumination area comprises an illumination source for emitting light based on the image content of the display device. The illumination source may be incandescent sources such as filament lamps, photo-luminescent sources such as gaseous discharges, fluorescent sources, phosphorescence sources, lasers, electro-luminescent sources such as luminescent lamps, cathode luminescent sources using electronic satiation, luminescent sources including galvano-luminescent sources, crystallo-luminescent sources, kine-luminscent sources, thermo-luminescent sources, tribo-luminescent sources, sono-luminescent sources and radio-luminescent sources.

In an embodiment the illumination areas are integrated into the display device.

In other embodiments the illumination areas may be stand-alone with connectivity to the display device.

Information Signal

The information signal may according to some embodiments be an image or image sequence data signal, a video signal, audio signal or a combined information signal. The information signal may comprise parameters such as intensity, brightness, color, and frequency.

Figure 2:
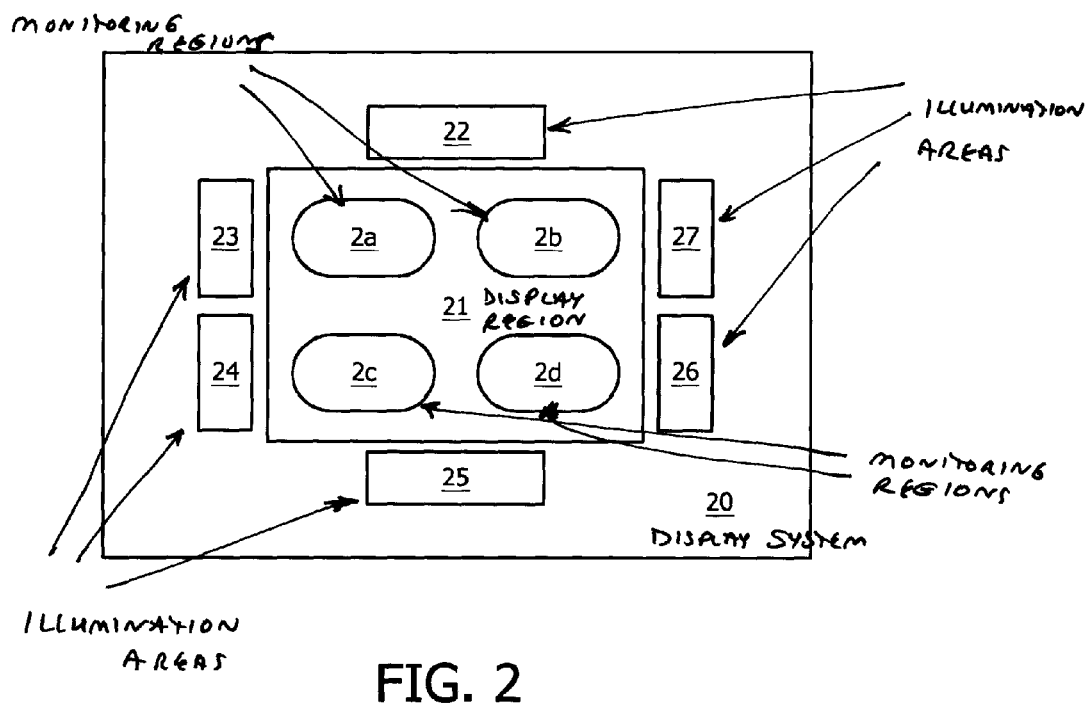
FIG. 2 is a schematic illustration of a system according to an embodiment.

In an embodiment the light radiation color and brightness that each illumination area emit depends on the position of the illumination area within the display system and the color and brightness content of a monitoring region, comprised in the information signal, to which it is connected. In FIG. 2 the display region 21 is divided into several monitoring regions, each monitoring region being connected to at least one illumination area. FIG. 2 illustrates a display system 20 comprising four monitoring regions 2a, 2b, 2c, and 2d and six illumination areas 22, 23, 24, 25, 26, 27. Each illumination area is via a control unit and monitor unit, such as an electric drive circuit, connected to at least one monitoring region according to the following Table 1.

TABLE 1

| Illumination area | Monitoring region |
| --- | --- |
| 22 | 2a and 2b |
| 23 | 2a |
| 24 | 2c |
| 25 | 2c and 2d |
| 26 | 2d |
| 27 | 2b |

As may be observed in Table 1, illumination area 22 is connected to the combined color information of monitoring region 2a and 2b. Similarly, illumination area 25 is connected to the combined color information of monitoring segment 2c and 2d. The illumination areas 23, 24, 26, and 27 correspond to monitoring regions 2a, 2c, 2d, and, 2b, respectively.

If a monitoring region contains predominantly green colors at a point in time, the first signal from the monitor unit will comprise information to emit a green color and so forth. The monitor unit that via the control unit is connected to the illumination areas is responsive to color and brightness information presented in the monitoring regions and produce signals for the illumination areas, which are fed into the control unit for controlling the color and brightness of each illumination area in the display system.

Monitor Unit

The monitor unit is configured to receive the information signal and to generate a first signal that is fed to the control unit. The first signal may comprise information such as which monitoring region of the display region corresponds to which illumination area, each illumination area color, brightness, frequency etc.

Control Unit

The control unit is capable of controlling the light radiation of the illumination areas of the display system. It continuously receives signals from the monitor unit regarding the color and brightness of each illumination area and may use this information together with other criteria in order to control the light radiation color and brightness of the illumination areas.

The reaction time of an illumination area may according to some embodiments be equal to an integration time, or integration factor, such as a number of frames of the information signal, over the first signal. The integration over the first signal may relate to color summation over a number of frames, e.g. 100 frames, of the information signal. This means for illumination areas having longer reaction times, i.e. longer integration times, that fast changing of colors are filtered, i.e. smoothened, out. This provides the advantage of smooth changing colors of illumination areas with long integration time and rapid color changes of illumination areas with short integration time. In some embodiments the emitted color from the illumination areas, using the longest reaction times, represents the background color of the current image or image sequence presented in the display region.

In another embodiment the control unit controls the intensity and color emitted by each illumination area, based on the first signal. In this embodiment the first signal also includes color and intensity information originating from the information signal.

There are several ways of how to create the illumination area input signals, using which algorithms etc. In a simple example the algorithm just repeats the average or peak color of a certain monitoring area to its corresponding illumination area, however several algorithms are known in this regard and may be utilized by the display system according to some embodiment of the invention.

Action Signal

Figure 3:
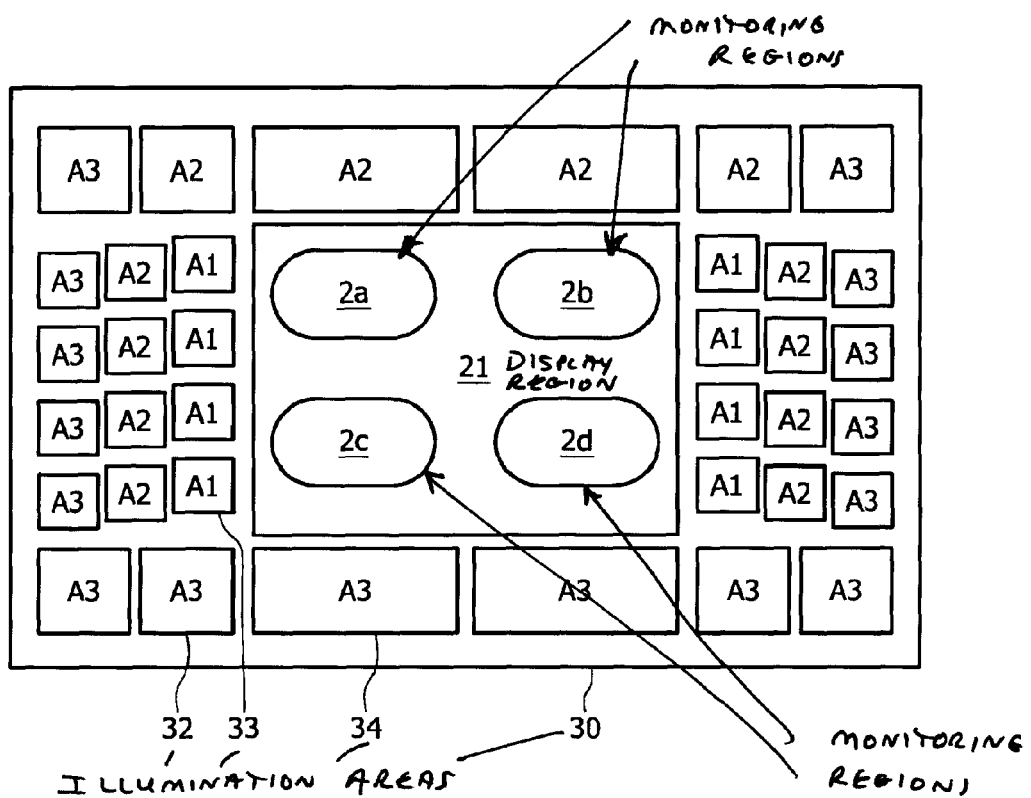
FIG. 3 is a schematic illustration of a system according to an embodiment.

In an embodiment the control unit additionally controls the reaction time of each illumination area depending on each illumination area position within the display system together with the signal from the monitor unit. Hence, the control unit utilizes several reaction times for different illumination areas. In this way the different illumination areas react temporally different to the first signal from the monitor unit. Such a system is described in FIG. 3 wherein different illumination areas 32, 33, 34 of the system has different reaction times indicated by A1, A2, A3. Display system setups, utilizing different number of monitoring regions connected to illumination areas etc, other than those described above are equally possible and are obvious to a skilled person and fall under the scope of the invention.

In an embodiment the control unit further utilizes actions occurring in the display region to control the reaction time of each illumination area.

In this way the reaction times of illumination areas which are integrated over time, such as A2 and A3, changes immediately when an action, such as a scene change is detected in the display region in order to keep the smooth continuation of the display region into the backlighting. This means that some illumination areas that are integrated over time, when a scene change is detected, instantly may become frame synchronous to increase the viewing performance of rapid changes in the display region.

The action, such as scene change, triggering the change of the reaction times of individual illumination areas may be measured as a threshold value based on an action signal corresponding to the action in the display region. If the action signal is below the threshold value the reaction times are mainly dependent on the position of the illumination areas. However, when the action signal is above the threshold value the reaction times changes simultaneously. As an example, all illumination area reaction times may be set to the same value as the illumination areas with the lowest reaction time in the system, such as A1 in FIG. 3.

A method of extracting actions, such as motions from image sequence content, is by comparing different frames and doing so, generating a vector field indicating the direction and speed with which pixels move. In practice macro blocks consist of several pixels and lines, e.g. 128×128, because pixel based processing would require too much computational capacity. Such a vector field may then be used to identify where motion is present.

In an embodiment the monitor unit generates the action signal based on a scene change detection algorithm, such that the first signal comprises scene change information.

In another embodiment the control unit generates the action signal based on a scene change detection algorithm.

In an embodiment the scene change algorithm may be included in a commonly known scene change detector equipped in a display device, such as a television set. Scene change detectors are commonly required for other processing, such as to reset several parameters in Philips Digital Natural Motion technology to produce a smooth impression of moving objects in film material. According to this embodiment, a scene change detected by the scene change detector may be included in the first signal that is fed to the control unit for controlling the reaction time of each illumination area.

In a practical implementation, once a scene change is detected in the information signal, the monitoring unit provides the control unit with the first signal comprising the scene change information. The control unit then controls the reaction time for each illumination area of the system such that colors and brightness for at least some illumination areas instantly will correspond to the new scene. This results in a very fast adaptation of the new information. Subsequently, e.g. after approximately a single frame, i.e 17 ms on a 60 Hz video frequency and 20 ms on a 50 Hz video frequency, the control unit re-changes the reaction time to the original setting used for each illumination area.

There are several commonly known ways of detecting a scene change in an information signal comprising image sequence information or a video signal. One way is to calculate a motion field for the current frame and compare this motion field to the previous motion field. Another way is to utilize a histogram, such as luminance histogram, for the current frame and compare the histogram with the histogram for a previous frame. In an embodiment, wherein the scene change detector is based on luminance histograms, and the information signal comprises a thunder lightning sequence, this will certainly result in scene changes between light and dark parts of the presented information signal content over time. Correspondingly, the reaction time of affected illumination areas will be set low so as to the illumination areas also change rapidly from light to dark. This particular effect could be regarded as restless, however, as stated earlier, there is still a huge correlation between the emitted light radiation from the illumination areas and the scene.

In another embodiment, wherein the scene change detector is based on luminance histograms, and the information signal comprises a typical space battle fight sequence, the scene change detector may not detect any scene change so all this restlessness of the current scene is hence filtered out and the reaction time of the affected illumination areas will not be changed accordingly. This provides a relaxed viewing experience.

In another embodiment, wherein the scene change detector is based on luminance histograms, and the information signal comprises a big explosion of a certain big object, this may result in that a scene change is detected so the reaction time of the affected illumination areas will change accordingly. An advantage of the last three mentioned embodiments is that the user enjoys both relaxed and immersive effects in the backlighting constituted by the emitted light radiation from the illumination areas of the display system while e.g. watching an action movie.

Still another way is to compare the contours, such as sharp edges, of the current frame to the contours of a previous frame to see if the resulting pattern differs to a predetermined extent. Combinations of the above mentioned ways of detecting scene changes are also possible. Furthermore it is possible that scene change information may also be a control flag in a media stream for future media formats. This feature is yet not supported in current media formats, such as for the MPEG standard.

In an embodiment any known means for detection of a scene change may be used in conjunction with the control unit to control the reaction time of an illumination area using the control unit.

A scene change does not necessarily concern all of the presented image content presented in the display region. Rapid brightness and/or color changes, meaning sub scene changes, in parts of the display region may be detected e.g. by a scene change detector for each monitoring region, and forwarded in the first signal to the control unit resulting in changing the reaction time for illumination areas connected to the affected monitoring region. As an example, with reference to FIG. 2, one scene change detector (not shown) is connected to each of the monitoring regions 2a-2d. As an example, all illumination areas utilize a reaction time that is longer than the time that each frame of the image sequence is presented on the display region. At one point in time, the scene detector connected to monitoring region 2d, detects a scene change. As each scene change detector is connected to the monitoring unit, the corresponding first signal will comprise the sub scene change for monitoring region 2d. Accordingly, the control unit will change the reaction time for the affected illumination areas, in this case illumination area 26. As illumination area 25 contains combined information from monitoring region 2c and 2d the reaction time may optionally also be changed accordingly. It should be appreciated that the size of the monitoring region thus affects the relaxed viewing experience for the sub-scene change embodiment, meaning that as the monitoring region size decreases, a sudden change in the monitoring region may not be a sub-scene change but e.g. an object flashing trough the monitoring region, which leads to more restless viewing experience. Accordingly, it is important to consider this aspect when utilizing a display system according to an embodiment having sub-scene change capability. In an embodiment, when a scene change is detected in a monitoring region of the display region, the reaction time for at least some illumination areas connected to the monitoring region will be changed to be frame synchronous, i.e. reaction time/integration time of 17 ms at 60 Hz video frequency. In another embodiment the reaction time for at least some illumination areas connected to the monitoring region may be changed into 2 frames (34 ms at 60 Hz), 3 frames (50 ms at 60 Hz) or 4 frames (66 ms at 60 Hz).

In an embodiment the control unit further controls the reaction time of each illumination area depending on image or image sequence content presented in the display region. This means that the reaction times are variables depending on both the image or image sequence content and their individual position within the display system. The reaction times of the illumination area may be used to create different viewing experiences and/or state of minds to a user. Illumination areas with short reaction times in the periphery may create stressful and/or restless viewing, however in some cases it may be desired to increase this effect of sudden actions, movements etc to all of the illumination areas for a short period of time. This is performed by letting the reaction time of each illumination area both be dependent on its position within the display system and the action content of the presented image or image sequence on the display region. An advantage of this embodiment is that when no sudden actions is presented in the display region the illumination areas have different reaction times depending on their individual position as explained above, which provides a more peaceful backlighting effect while still being able to stress action happening in the display region, e.g. motion and scene changes. On the other hand when very rapid actions occur in the display region, such as a scene change, the reaction times for at least some of the illumination areas are instantly changed to a low value to provide an optimal viewing performance during the rapid change. Immediately after the rapid change the illumination area reaction times return to the same values that they had before the rapid change.

The monitor unit and control unit may comprise one or several processors with one or several memories. The processor may be any of variety of processors, such as Intel or AMD processors, CPUs, microprocessors, Programmable Intelligent Computer (PIC) microcontrollers, Digital Signal Processors (DSP), Electrically Programmable Logic Devices (EPLD) etc. However, the scope of the invention is not limited to these specific processors. The processor may run a computer program comprising code segments for performing image analysis of the image content in the display region in order to produce an input signal dependent on the color and brightness of the image content that is fed to an illumination area. The memory may be any memory capable of storing information, such as Random Access Memories (RAM) such as, Double Density RAM (DDR, DDR2), Single Density RAM (SDRAM), Static RAM (SRAM), Dynamic RAM (DRAM), Video RAM (VRAM), etc. The memory may also be a FLASH memory such as a USB, Compact Flash, SmartMedia, MMC memory, MemoryStick, SD Card, MiniSD, MicroSD, xD Card, TransFlash, and MicroDrive memory etc. However, the scope of the invention is not limited to these specific memories.

In an embodiment the monitor unit and the control unit is comprised in one unit.

In some embodiments several monitor units and control units may be comprised in the display system.

The display system according to some embodiments may comprise display devices having display regions such as TVs, flat TVs, cathode ray tubes CRTs, liquid crystal displays LCDs, plasma discharge displays, projection displays, thin-film printed optically-active polymer display or a display using functionally equivalent display technology. In an embodiment the display system is positioned substantially behind the image display region and arranged to project light radiation towards a surface disposed behind the display region. In use the display system provides illumination of at least at part around the display region of a display device.

Figure 4:
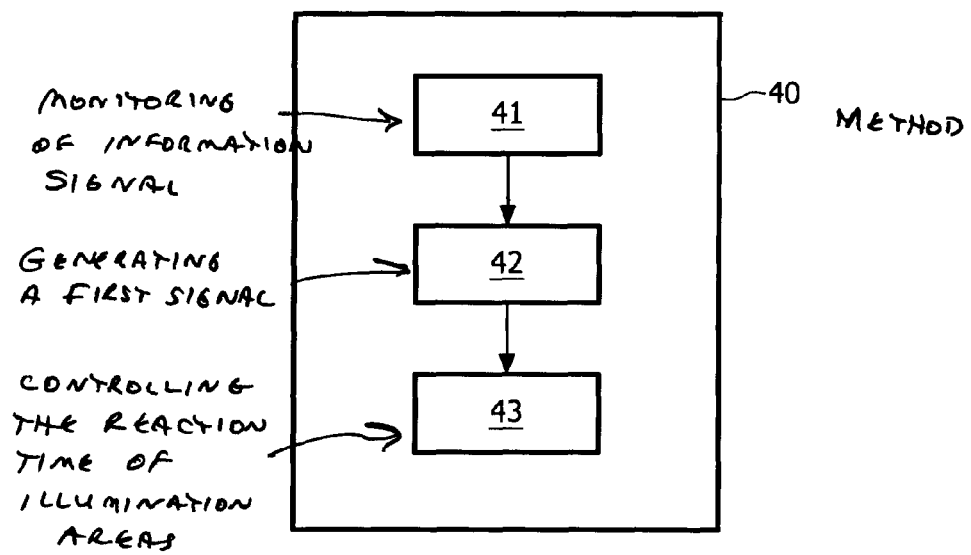
FIG. 4 is a block diagram of a method according to an embodiment.

In an embodiment, according to FIG. 4, a method 40 is provided. The method comprises monitoring 41 an information signal, generating 42 a first signal based at least partly on the information comprised in the information signal, and controlling 43 the reaction time of at least one illumination area capable of emitting properties of light, based on the first signal.

Figure 5:
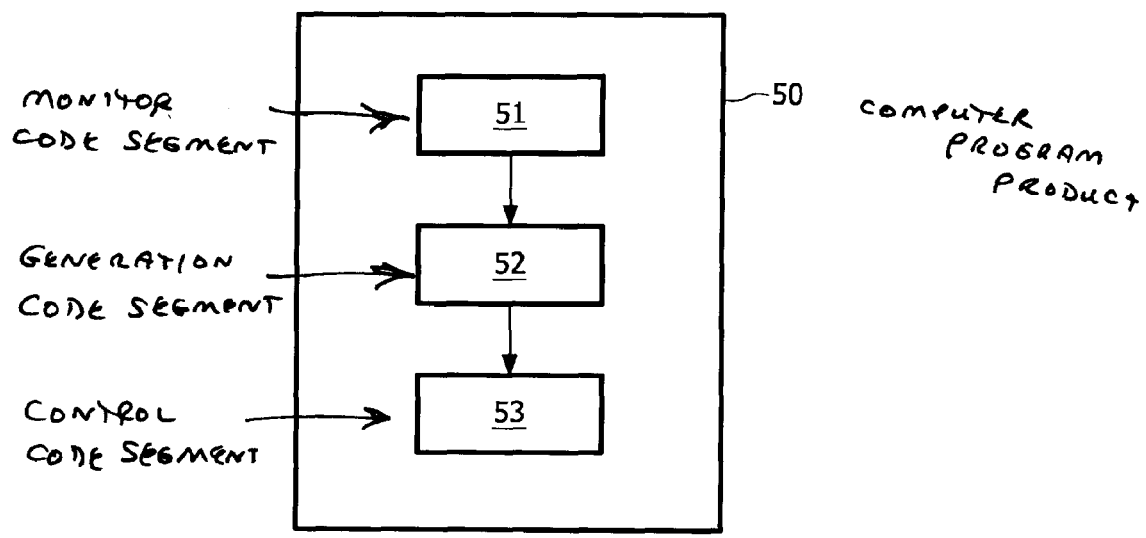
FIG. 5 is a block diagram of a computer-readable medium according to an embodiment.

In an embodiment, according to FIG. 5, a computer-readable medium 50 having embodied thereon a computer program for processing by a processor is provided. The computer program comprises a monitor code segment 51 for monitoring an information signal, a generation code segment 52 for generating a first signal based at least partly on the information comprised in the information signal, and a control code segment 53 for controlling the reaction time of at least one illumination area capable of emitting properties of light, based on the first signal.

In an embodiment the computer-readable medium comprises code segments arranged, when run by an apparatus having computer-processing properties, for performing all of the method steps defined in some embodiments.

In an embodiment the computer-readable medium comprises code segments arranged, when run by an apparatus having computer-processing properties, for performing all of the display system functionalities defined in some embodiments.

Applications and use of the above-described embodiments according to the invention are various and include all cases, in which backlighting is desired. The present invention may according to some embodiments be used in all backlighting television sets that have a scene change detector inside. In some embodiments the present invention may be integrated into current backlighting modes or it may be added as a new mode in future backlighting systems.

The invention may be implemented in any suitable form including hardware, software, firmware or any combination of these. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A supplementary visual display system for use in conjunction with a display device having an image display region, the system comprising:
one or more illumination areas arranged to project illumination radiated therefrom so as to illuminate a region that at least partially peripherally surrounds the image display region and wherein said image display region has a separate light source;
a monitor unit configured to monitor a video signal, and to generate a first signal based at least partly on the information comprised in said video signal;
a control unit configured to control the reaction time of at least one illumination area capable of emitting properties of light and comprised in said system, based on said first signal; wherein,
said control unit reaction time of an illumination area to correspond integration over at least two frames of said video signal content; unless an action, is detected in said first signal, whereupon said control unit controls the reaction time of said illumination area to be frame synchronous to said video signal content.

2. The system according to claim 1 further comprising a display region capable of presenting said information video signal to a user.

3. The system according to claim 2, wherein said properties of light is the intensity and color in one or more monitoring regions of said display region when an image or image sequence is presented thereon, and wherein said first signal comprises information regarding at least said intensity and color of each monitoring region.

4. The system according to claim 3, wherein a monitoring region corresponds to at least one or more illumination areas.

5. The system according to claim 2, wherein said display region is comprised in a display device.

6. The system according to claim 2, wherein said video signal and said at least one illumination area are projected on a surface.

7. The system according to claim 1, wherein said first signal comprises information regarding a scene change in said video signal.

8. The system according to claim 1, further comprising a scene change detector configured to generate an scene change signal, and connected to said monitor unit or said control unit, said scene change is used by said control unit to control the reaction time of at least one illumination area of said system.

9. The system according to claim 1, wherein the reaction time of at least one illumination area is frame synchronous to the video signal content.

10. The system according to claim 1 being comprised in a projector.

11. A method of operation a supplementary visual display for use in conjunction with a display device having an image display region, the method comprising:
disposing one or more illumination areas arranged to project illumination radiated therefrom so as to illuminate a region that at least partially peripherally surrounds the image display region, and wherein said image display region has a separate light source;
monitoring a video signal;
generating a first signal based at least partly on the information comprised in said video signal; and
controlling the reaction time of at least one illumination area capable of emitting properties of light, based on said first signal such that
said reaction time of an illumination area is controlled to an integration over at least two frames of said video signal content; unless an action, is detected in said first signal, whereupon the reaction time of said illumination area is controlled to be frame synchronous to said video signal content.

12. A non-transitory computer-readable medium having embodied thereon a computer program for processing by a processor to thereby implement a method of operating a supplementary visual display for use in conjunction with a display device having an image display region and one or more illumination areas arranged to project illumination radiated therefrom so as to illuminate a region that at least partially peripherally surrounds the image display region, and wherein said image display ration has a separate light source; said computer program comprising:
a monitor code segment for monitoring a video signal,
a generation code segment for generating a first signal based at least partly on the information comprised in said video signal, and
a control code segment for controlling the reaction time of at least one illumination area capable of emitting properties of light, based on said first signal, such that
said reaction time of an illumination area is controlled to correspond to an integration over at least two frames of said video signal content; unless an action, is detected in said first signal, whereupon the reaction time of said illumination area is controlled to be frame synchronous to said video signal content.

* * * * *